Oct. 2, 1956  K. E. HOFFMANN  2,765,007
BOLT MEASURING ATTACHMENT FOR CHAIN SAWS AND THE LIKE
Filed Dec. 13, 1954
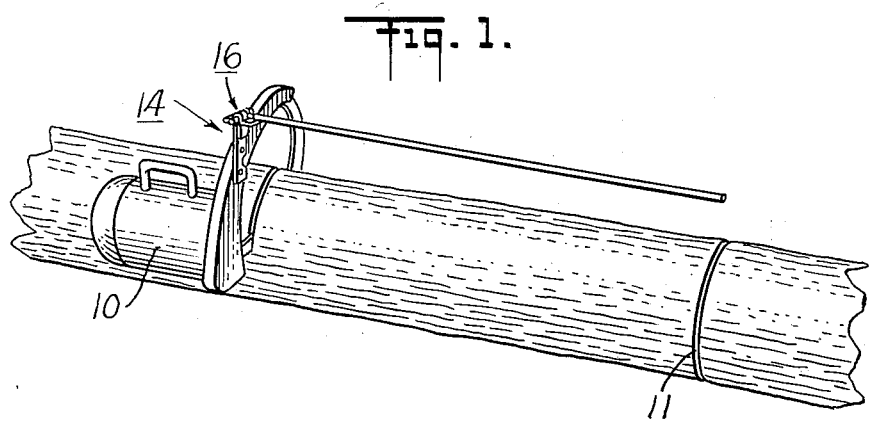
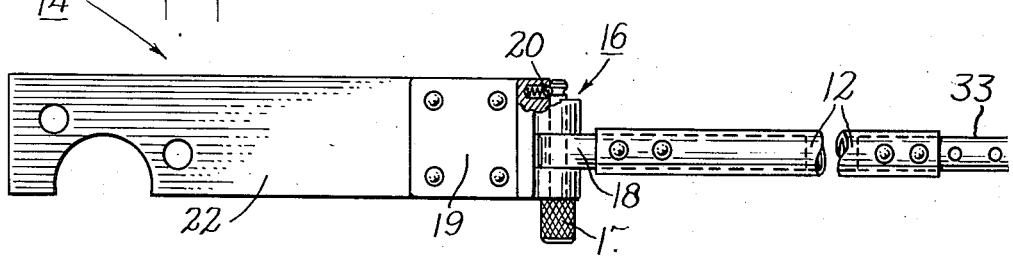
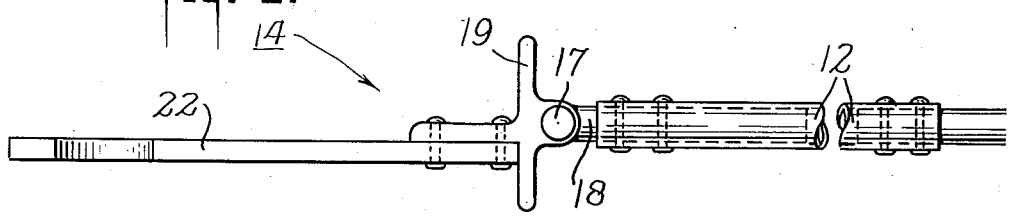
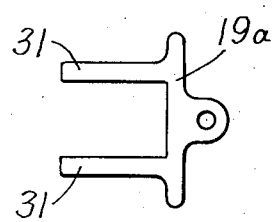
INVENTOR
Karl E. Hoffmann
BY
Curtis, Morris & Safford
ATTORNEYS

United States Patent Office 2,765,007
Patented Oct. 2, 1956

2,765,007

BOLT MEASURING ATTACHMENT FOR CHAIN SAWS AND THE LIKE

Karl E. Hoffmann, Kingston, N. J.

Application December 13, 1954, Serial No. 474,760

2 Claims. (Cl. 143—157)

This invention relates to a measuring device for use with a portable power driven saw.

An object of this invention is to provide for convenient and easy measuring of bolts while cutting up a tree by a portable power saw and to guide the operator with greatest efficiency for cutting required lengths, e. g., bolts as required for sale to pulp mills, or cord used for burning, etc.

Another object is to provide such a measuring device which can easily be mounted on the frame of the saw and can thereafter be quickly detached or reattached to the frame as desired.

In using a portable power driven chain saw to cut a log into shorter uniform length pieces, it has required a substantial time for the operator to measure off and mark the lengths of the pieces to insure that they are uniformly the correct length. Previously, this has often been done by an extra man who marks at points along the length of the log so that the sawing crew will know where to cut. This saves the sawing crew the added burden of having to stop after each cut to mark the next one, but, since an extra man is required, the cost has been clearly apparent.

Alternatively, the sawing crew can mark for itself the places where to cut. Although in this case the extra effort is less obvious, actually it may be greater; the total time consumed just in measuring sometimes becomes comparable to the time needed to make the cuts, especially when using modern high-powered saws which can cut through an 8" tree in less than a minute.

Accordingly there is a definite need for a measuring device which can be fastened directly to the frame of a saw so that it does not require separate handling and which is always ready for use in measuring position. This device must at the same time be compact and light-weight enough not to add much to the weight of the saw and yet sufficiently strong and rugged to withstand rough handling.

In accordance with the present invention there is provided an improved measuring rod and mounting bracket therefor which can be bolted directly to the frame of a standard chain saw without preliminary fitting and can be adapted to other saws with only minor alterations. This bracket is so arranged that the measuring rod can readily be separated from it when desired, as when transporting the saw from one work location to another, and can thereafter readily be reattached to the saw in measuring position. The bracket is also arranged so that the rod can be extended transversely either to the right or to the left of the plane along which a cut is to be made as best suited to a particular work location.

A fuller understanding of the nature of the present invention together with a better appreciation of its various advantages will best be gained from a study of the following description given in connection with the accompanying drawings in which:

Figure 1 is a sketch of a portable chain saw in cutting position over a felled tree with the measuring device of the invention attached to the frame of the saw and extending from the right thereof along the tree to a previously made saw cut;

Figure 2 is an enlarged view of the measuring device alone viewed from the right in Figure 1 but with the measuring rod extended straight instead of to the right;

Figure 3 is a plan view of the measuring device from the top of Figure 2; and

Figure 4 is a modified hinge part adapted to replace that shown in Figures 2 and 3.

Referring now particularly to the drawings, Figure 1 is a sketch indicating the manner of employment of the present invention in measuring the length between successive cuts along a log. A portable power-driven saw 10, while in operation, is located at a distance measured along the tree from a cut 11 by means of a measuring rod 12 which extends from the right of the saw to the plane of cut 11. This measuring rod is fixed to the frame of the saw by bracket 14 which bolts directly onto the saw frame. After a cut has been made by the saw positioned as shown, the place for the next cut can be found by moving the saw to the left from this cut along the tree a distance determined by the length of rod 12. Thus the tree can be cut into accurately measured lengths with less time or cost for measuring the individual lengths.

As seen in Figure 2, measuring rod 12 is connected to the mounting bracket 14 through a hinge generally indicated at 16, the parts of which are kept together by a removable pin 17. Part 18 of the hinge is a short stub or plug whose right end is fitted tightly within a recess in the end of rod 12 and whose left end is a rounded single eyed shoulder through which pin 17 passes. Part 19 of the hinge mates with part 18 and provides closely spaced on each side thereof a similar single eyed shoulder. Pin 17 passes through the openings in these three shoulders and is locked in position in part 19 by a spring urged ball lock 20 which engages a groove in the end of the pin. Thus the pin is positively retained in the hinge but can quickly and easily be withdrawn when it is desired to detach rod 12 from the saw 10.

As seen in Figure 3, part 19 is an integral seamless structure formed by extrusion to the cross section shown, machined with a transverse slot for the shoulder 18 and drilled to receive pin 17. Advantageously pin 17 is formed at its head end with a taper of about 5° (or other "sticking taper") to hold pin 17 against dropping out. The hole may be drilled with a mating taper but even without that a hard pin will form the magnesium or aluminum preferably used for the hinge, so as to give the necessary taper grip.

If the hinge part 19 is T-shaped as shown, rod 12 can be swung against one wing of the T in either direction and thus be positioned at right angles to bracket 14. The leaf portion of part 19 is fastened by rivets or otherwise to one of a variety of attaching plates 22 each of which is drilled and shaped to fit a given saw so that it can be bolted thereto without alteration of the saw. It is to be understood therefore that plate 22 may have any one of many different configurations and that the measuring device of the invention can be readily adapted to fit any one of the many different makes of saws simply by choosing the corresponding plate.

Alternatively part 19 may be made in a different shape, e. g. the U-shaped extrusion part 19a shown in Figure 4 when such a shape is desirable to fit a particular saw. This is interchangeable with the hinge part 19 by mere removal of pin 17. In this case the legs 31 of part 19a can be bolted directly to the saw and plate 22 omitted.

Rod 12 is preferably of lightweight tubing such as aluminum or magnesium or thin stainless steel and has a length such that the distance between cuts in Figure 1 equals a predetermined distance, for example, three feet. The length of this rod can be increased when desired by inserting an extension plug 33 in its open end. The parts of hinge 16 as indicated above, are advantageously aluminum or magnesium extruded shapes machined to form the interfitting knuckles and drilled for reception of the hinge pin.

The above description is intended in illustration and to aid others in making such changes and modifications in the structure as will best adapt it to various conditions of use. Such changes and modifications can be made without departing from the spirit or scope of the invention as set forth.

What is claimed is:

1. A measuring device of the character described including: a mounting bracket to be fastened directly to the frame of a saw comprising an attaching plate shaped and drilled so that it can be bolted to the saw without alteration of the saw, a hinge part fastened to said plate and having as integral parts thereof spaced shoulders with openings to accommodate a hinge pin said hinge part also having an integral portion extending on each side of said shoulders and at right angles to said attaching plate; a tubular measuring rod adapted to be connected to said mounting bracket; a cylindrical plug fitted in one end of said rod and mating with the shoulders of said hinge part; and a removable hinge pin holding said plug and hinge part together, said pin being retained in place by a spring urged ball lock carried by said hinge part and engaging a groove in said pin, said rod being adapted to swing about the axis of said pin to engage the integral portion of said hinge part and thus lie generally at right angles to the cutting plane of the saw.

2. A measuring device of the character described including: a lightweight rod having a recess in one end; a short plug forming one part of a hinge, one end of said plug being tightly fitted into said recess; a one piece member forming another part of the hinge and adapted to mate with said plug, said member being a T-shaped extrusion having a cross portion and a single stem portion at right angles thereto and two spaced shoulders on top of said cross portion; a hinge pin for passing through portions of said plug and said member and for retaining them in mating position; and a spring urged ball lock carried by said member for engaging a groove in said hinge pin, said rod when hinged to said member being adapted to lie against the cross portion of said member in a position in either direction at right angles to the stem portion thereof, and an attaching plate fixed to the stem portion of said member and adapted to bolt to the frame of a particular make saw without alteration in the frame of the saw.

References Cited in the file of this patent

UNITED STATES PATENTS

| | | |
|---|---|---|
| 1,848,330 | Emmons | Mar. 8, 1932 |
| 1,881,295 | Porcello | Oct. 4, 1932 |
| 2,632,483 | Jamack | Mar. 24, 1953 |